United States Patent
Daage et al.

(10) Patent No.: US 6,355,593 B1
(45) Date of Patent: Mar. 12, 2002

(54) FISCHER-TROPSCH CATALYST ENHANCEMENT

(75) Inventors: Michel A. Daage; Russell John Koveal, both of Baton Rouge, LA (US); Albert L'Vovich Lapidus; Alla Jurievna Krylova, both of Moscow (RU); Shawn Paul Brennan, Baton Rouge, LA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 09/654,183

(22) Filed: Sep. 1, 2000

(51) Int. Cl.⁷ .......................... B01J 31/00; B01J 23/40; C07C 27/00
(52) U.S. Cl. ...................... 502/111; 502/104; 502/107; 502/326; 518/715
(58) Field of Search .......................... 518/715; 502/104, 502/107, 111, 326

(56) References Cited

U.S. PATENT DOCUMENTS

| | | | |
|---|---|---|---|
| 2,583,619 A | 1/1952 | White | 252/477 |
| 3,661,798 A | 5/1972 | Cosyns et al. | 252/416 |
| 4,089,812 A | 5/1978 | O'Hare et al. | 252/466 J |
| 4,399,234 A | 8/1983 | Beuther et al. | 518/715 |
| 4,492,774 A | 1/1985 | Kibby et al. | 518/713 |
| 4,585,798 A | 4/1986 | Beuther et al. | 518/715 |
| 4,670,414 A | 6/1987 | Kobylinski et al. | 502/174 |
| 4,826,799 A | 5/1989 | Cheng et al. | 502/301 |
| 4,895,994 A | 1/1990 | Cheng et al. | 585/270 |
| 4,910,175 A | 3/1990 | Michel et al. | 502/24 |
| 4,977,126 A | 12/1990 | Mauldin et al. | 502/242 |
| 5,168,091 A | 12/1992 | Berhmann et al. | 502/325 |
| 5,260,239 A | 11/1993 | Hsia | 502/30 |
| 5,268,344 A | 12/1993 | Pedrick et al. | 502/30 |
| 5,283,216 A | 2/1994 | Mitchell | 502/30 |
| 5,292,705 A | 3/1994 | Mitchell | 502/325 |
| 5,348,982 A | 9/1994 | Herbolzheimer et al. | 518/700 |
| 5,382,748 A | 1/1995 | Behrmann et al. | 585/899 |
| 5,536,694 A | 7/1996 | Schuetz et al. | 502/301 |

FOREIGN PATENT DOCUMENTS

EP 0253924 1/1988

OTHER PUBLICATIONS

"Sonochemical synthesis of amorphous iron," Kenneth S. Suslick, et al., Nature, vol. 353, Oct. 3, 1991, pp. 414–416.
"Synthesis and Characterization of Anisometric Cobalt Nanoclusters," Charles P. Gibson, et al., Science, vol. 267, Mar. 3, 1995, pp. 1338–1340.
"Influence of oxidation–reduction treatment on the microstructure of $Co/SiO_2$ catalyst," D. Potoczna–Petru, et al., Applied Catalysis A: General 175 (1998) pp. 113–120.
"Role of Alloying Metals in Raney Ni, Co, and Cu Catalysts," A. I. Savelov, et al; Russian Journal of Physical Chemistry, Nov. 1988, pp. 1537–1540.

Primary Examiner—Johann Richter
Assistant Examiner—J. Parsa
(74) Attorney, Agent, or Firm—Jay Simon; Charles J. Brumlik

(57) ABSTRACT

A process of enhancing both the activity and the methane selectivity of a Dispersed Active Metal ("DAM") hydrogenation catalyst is disclosed wherein the DAM undergoes low temperature oxidation in a slurry phase to form an oxidized catalyst precursor that is unique in comparison to those formed by conventional high temperature deactivation processes. The oxidized catalyst precursor, which is stable, is subsequently reduced to form an enhanced catalyst by treatment with hydrogen-containing gas at elevated temperature. The process is useful in a wide variety of DAMs formed by art-recognized techniques. The process is equally applicable to the enhanced catalysts formed from the oxidized precursors and their use in hydrogenation reactions.

11 Claims, No Drawings

FISCHER-TROPSCH CATALYST ENHANCEMENT

This invention relates to a process for the activation of dispersed active metal catalysts that enhances their activity and selectivity in the production of higher hydrocarbons from synthesis gas.

BACKGROUND OF THE INVENTION

The production of higher hydrocarbon materials from synthesis gas, i.e. carbon monoxide and hydrogen, commonly known as the Fischer-Tropsch ("F-T") process, has been in commercial use for many years. Such processes rely on specialized catalysts. The original catalysts for the Fischer-Tropsch synthesis were nickel. Nickel is still the preferred catalyst for hydrogenation of fats and specialty chemicals. Over the years, other metals, particularly iron and cobalt, have been preferred in the Fischer-Tropsch synthesis of higher hydrocarbons whereas copper has been the catalyst of choice for alcohol synthesis. Cobalt is particularly preferred for Fischer-Tropsch synthesis due its high productivity and comparatively low methane selectivity. As the technology of these syntheses developed over the years, the catalysts became more refined and were augmented by other metals and/or metal oxides that function to promote their catalytic activity. These promoter metals include the Group VIII metals, such as platinum, palladium, rhenium, ruthenium and iridium. Metal oxide promoters include the oxides of a broader range of metals, such as molybdenum, tungsten, zirconium, magnesium, manganese and titanium. Those of ordinary skill in the art will appreciate that the choice of a particular metal or alloy for fabricating a catalyst to be utilized in Fischer-Tropsch synthesis will depend in large measure on the desired product or products.

Particularly suited for the production of hydrocarbons by Fischer-Tropsch synthesis from synthesis gas are Dispersed Active Metals ("DAM") which are primarily, i.e. at least about 50 wt. %, preferably at least 80 Wt. %, composed of one or a mixture of metals such as described above and are, without further treatment, capable of catalyzing Fischer-Tropsch synthesis. DAM catalysts may be prepared by any of a number of art-recognized processes.

In 1924, M. Raney prepared a nickel hydrogenation catalyst by a process known today as the Raney Process. For purposes of simplicity, the term "Raney" will be utilized herein as a generic term to describe the process, alloys and catalysts obtained thereby. This specific synthesis, in essence, comprises forming at least a binary alloy of metals, at least one of which can be extracted, and extracting it thereby leaving a porous residue of the non-soluble metal or metals that possesses catalytic activity. The residue, or non-extractable, catalyst metals are well known to those skilled in the art and include Ni, Co, Cu, Fe and the Group VIII noble metals. Likewise, the leachable or soluble metal group is well known and includes aluminum, zinc, titanium and silicon, typically aluminum. Once alloys are formed of at least one member of each of these groups of metals, they are ground to a fine powder and treated with strong caustic, such as sodium hydroxide, to leach the soluble metal.

There exist many variations of the basic preparation of Raney catalysts such as, for example, deposition of alloys onto a performed support by flame spraying, (U.S. Pat. No. 4,089,812), formation of the alloy by surface diffusion of aluminum on a non-leachable metal substrate (U.S. Pat. No. 2,583,619), and forming pellets from the powdered alloys for use in fixed bed reactions vessels (U.S. Pat. Nos. 4,826,799, 4,895,994 and 5,536,694). These developments have made possible the use of shaped Raney catalysts in fixed bed reaction vessels.

A preferred reactor carrying out for Fischer-Tropsch reactions utilizing DAM catalysts is the slurry bubble column developed by Exxon Research & Engineering Company. This reactor, which is ideally suited for carrying out highly exothermic, three-phase catalytic reactions, is described in U.S. Pat. No. 5,348,982. In such reactors, the solid phase catalyst is dispersed or held in suspension in a liquid phase by a gas phase that continuously bubbles through the liquid phase. The catalyst loading in slurry bubble reactors can vary within a broad range of concentrations, but must remain short of the so-termed "mud limit" where the concentration becomes so high that mixing and pumping of the slurry become so difficult that practical operation is no longer possible. The use of high metal-loading catalysts or bulk metal catalysts is preferred in slurry bubble reactors in order to maximize the productivity of both catalyst and reactor.

An extensive review of process of forming DAM catalysts can be found in "Active Metals", Edited by Alois Furstner, published by VCH Verlagsgesellschaft mbH, D-69451 Weinheim (FRG) in 1996 and the references cited therein. Methodologies described therein include the Reike method, the use of ultrasound, reduction of metal salts, colloids, nanoscale cluster and powders. Other relevant references include, for example, the preparation of amorphous iron catalyst by high intensity sonolysis of iron pentacarbonyl, Suslick et al., Nature, Vol. 353, pp 414–416 (1991) and the formation of single domain cobalt clusters by reduction of a cobalt salt with hydrazine, Gibson et el., Science, Vol. 267, pp 1338–1340, (1998). Finally, intermetallic alloys, particularly those known for forming metal hydrides, such as $LaCo_5$, can be formed into a fine powder by the application of hydrogen adsorption/desorption cycles. DAM catalysts can also be prepared by thermal or chemical decomposition of metal formates or oxalates. These methods are given as examples and are not intended in any way to limit the term "DAM" as utilized in the context of the present invention.

One of the primary characteristics of DAM catalysts is that, in their dry form, they are generally pyrophoric. For this reason, they are generally stored and shipped in airtight containers, typically as a slurry in an appropriate solvent, such as water or oil, or coated with a removable protective layer of an air-impervious material, such as wax. We are not aware of any DAM catalysts that are not used as they are formed, i.e. without no further treatment following extraction of the leachable metal and subsequent drying steps as described above. On the opposite end of the cycle, the manufacturers of DAMs recommend that spent catalysts, i.e. those no longer economically effective, must undergo deactivation in order that they may be safely disposed of. Such deactivation is generally achieved via oxidation of the metal by air oxidation or treatment with dilute bleach solution.

It will be appreciated that a means of enhancing the activity of the catalyst would greatly increase its value in the process. Another important aspect of the value of a catalyst is its selectivity which is the ratio of the percent of feed material converted to desired higher hydrocarbons to that of short chain hydrocarbons produced, primarily methane, commonly referred to as "methane selectivity". In accordance with the present invention, there is provided a process that not only significantly enhances the activity of DAM catalysts, but markedly enhances their methane selectivity as well.

SUMMARY OF THE INVENTION

In accordance with the present invention, Dispersed Active Metal ("DAM") Fischer-Tropsch catalysts are enhanced both in activity and methane selectivity by low temperature oxidative deactivation in a slurry phase to form an oxidized catalyst precursor comprising said metals and at least one of hydroxides thereof and oxides thereof followed by reductive reactivation with hydrogen at elevated temperature. The present invention also includes the use of slurry low temperature oxidation to form an oxidized catalyst precursor that differs compositionally from that obtained by conventional high temperature oxidation utilizing an oxygen-containing gas.

DETAILED DESCRIPTION OF THE INVENTION

It is well known to those skilled in the art of Fischer-Tropsch synthesis chemistry that Group VIII metal surfaces exhibit higher activities for catalytic reactions such as hydrogenation, methanation and Fischer-Tropsch synthesis when subjected to a high temperature oxidation-reduction (O-R) cycle. Such "activation" techniques are reviewed in Applied Catalysis, A. General 175, pp 113–120 (1998) and citations therein. A series of patents, e.g. U.S. Pat. Nos. 4,492,774; 4,399,234; 4,585,789 and 4,670,414 disclose activation of a cobalt catalyst by a reduction/oxidation/reduction (R-O-R) cycle. So far as we are aware, all such oxidation/reduction and reduction/oxidation/reduction cycles described in the literature are effected by treating a solid catalyst with an oxygen-containing gas at high temperatures. This treatment results in the formation of the most stable oxide of the metal, i.e. in the instance of cobalt, $Co_3O_4$. All DAMs treated in accordance with the invention are characterized by the capacity to exist in more than one oxidation state and, thereby, form more than one oxide. Heretofore, the process described above have sought to completely oxidize such DAMs to the highest oxidation state oxide which corresponds to the most stable oxide.

In the activation treatments described above, the oxygen content of the treating gas in the oxidation step varies from as low as 15 ppm to pure oxygen and the temperatures typically are between about 200° C. to 600° C. Several publications dealing with these activation methodologies also stress the importance of controlling the exothermicity of the reaction to avoid sintering of the cobalt oxide particles since that may be detrimental to the activity of the final catalyst. We have found that this latter observation is even more critical with regard to the oxidation of DAM catalysts because of their high metal content, particularly those that may also contain active hydrogen species as in Raney catalysts or metal hydrides.

It has been found in accordance with the present invention that significant enhancement in both the activity and methane selectivity for Fischer-Tropsch synthesis is realized by treating a DAM catalyst with an oxidation/reduction cycle wherein the oxidation is carried out in a slurry phase at low temperature. By low temperature is meant a temperature below 200° C., preferably below 100° C. The oxidation is effected by bubbling a gaseous oxidant through a slurry of the DAM catalyst, or by the slurry itself formed from or combined with an aqueous solution of a suitable oxidant. Typical conditions for the oxidative deactivation of a DAM catalyst in accordance with the present invention utilizing an oxidative gas are as follows: ratio of liquid to DAM by volume—at least about 3:1, preferably at least about 5:1; temperature—from about 25° C. to 100° C., preferably from about 50° C. to 80° C.; total pressure—from about 15 to 300 psia, preferably from about 15 to 100 psia; contact time for the DAM in the slurry—at least one hour, preferably until the DAM has lost pyrophoricity; and gas flow rate—at least 100 cc/min. Typical oxidative gases in addition to oxygen include ozone and nitrogen oxides, i.e. nitrous oxide and nitric oxide, all of which may be utilized in pure form, but typically are mixed with one or more inert diluent gases. Wherein oxygen is utilized, for example, typically air is caused to flow into the slurry. Alternatively, pure oxygen can be mixed with an inert gas in from about 1 to 50%, preferably from about 5 to 25% by volume.

Wherein the oxidative treatment in accordance with the present invention is carried out utilizing a dilute solution of an oxidant, the oxidant is chosen so as not to introduce substances into the slurry that are recognized as being permanent poisons of the Fischer-Tropsch synthesis, e.g. ionic forms of chlorine, bromine, phosphorus and sulfur. Included within the scope of oxidants in solution are solutions of compounds that form oxidants in situ upon contact with air, for example, certain alcohols will form hydroperoxides upon contact with air. Preferred oxidants include nitric acid and inorganic nitrates, for example, ammonium nitrate, hydrogen peroxide, and art-recognized organic peroxides or hydroperoxides. Those skilled in the art will appreciate that the concentration of individual oxidants will vary according to their oxidizing capacity. In general, the amount of the oxidant in the slurry and the duration of the oxidation are sufficient to insure oxidation to a point such that the resulting dry DAM material would not exhibit uncontrollable pyrophoric responses upon exposure to ambient air and moisture but not so great as to cause unwanted secondary reactions such as dissolution or extraction of the active metal ions in the catalyst.

The liquid utilized to form the slurry in accordance with the present process is preferably water. It is within the scope of the process, however, to utilize organic solvents that do not introduce any known poison of the Fischer-Tropsch synthesis and that are non-reactive with the conditions of the oxidation treatment. Hydrocarbons, particularly those derived from the Fischer-Tropsch synthesis itself are appropriate and may be used with either an oxygen-containing gas or dilute solution of the oxidants named above that are soluble therein, such as the organic peroxides. Further, mixtures of water and organic solvents miscible therewith can be utilized as well. Mixtures of water with immiscible solvents can also be utilized in combination with suitable dispersing or emulsifying agents present to form a continuous phase, i.e. an emulsion. Other suitable liquids include dense fluids, for example, supercritical fluids such as liquid phase light, i.e. C3–5 alkanes, cyclopentane and the like. Preferred mixed liquids include, without any intended limitation, water/lower alkanols, water/Fischer-Tropsch products, and water/alkanols/alkanes.

The oxidative treatment in accordance with the present invention may be carried out in any reactor apparatus suitable for slurry reactions including, with no limitation intended, fixed bed reactors, moving bed reactors, fluidized bed reactors, slurry reactors, bubbling bed reactors and the like. Irrespective of whether the slurry reactor is operated as a dispersed or slumped bed, the mixing conditions in the slurry will typically be somewhere between the theoretical limiting conditions of plug flow and complete back mixing.

The product of the low temperature oxidation treatment of a DAM in accordance with the present invention is a mixture of metallic and oxidic species. This is the result of the fact that the metals in the DAMs can exist in more than one oxidation state and, in the treatment of the invention, a significant portion of the active metal of the DAM is oxidized to a lower oxidation state. In contrast, the prior art high temperature oxidation treatments result in complete oxidation of the active metal to the highest, and most stable, oxidation state. For example, in the treatment of the present invention, a significant portion of cobalt metal is oxidized to CoO and/or Co(OH)$_2$ rather than Co$_3$O$_4$, iron metal is oxidized to FeO and/or Fe(OH)$_2$ rather than Fe$_3$O$_4$. Additionally, when the slurry in which the treatment of the invention is effected contains water, hydroxides of the metals will be formed as part of the mixture referred to above. This mixture is in fact an oxidized catalyst precursor wherein, on a mole percent basis, not more than 50% of the active metal present is in the form of the oxide of the highest oxidation state, and the highest oxidation state of the metal in combination with the amount in the metallic state does not exceed 85% of the active metal present, the remainder being lower oxidation state oxides and/or hydroxides. Preferably, not more than 25% of the active metal present is in the form of the oxide of the highest oxidation state, and the highest oxidation state of the metal in combination with the amount in the metallic state does not exceed 60% of the active metal present, the remainder being lower oxidation state oxides and/or hydroxides.

Upon completion of the oxidation treatment in accordance with the process of the invention, i.e. when the DAM no longer exhibits uncontrollable pyrophoricity, the resulting oxidized catalyst precursor is recovered from the slurry and dried. By not exhibiting uncontrollable pyrophoricity is meant that, upon filtering the DAM in air, the temperature should not rise above 200° C. The precursor is then converted to the active catalyst by reduction with hydrogen-containing gas at temperatures of from about 200° C. to 600° C., preferably from about 300° C. to 450° C., most preferably from about 340° C. to 400° C. Hydrogen partial pressure during the reduction would range from about 1 to 100 atmospheres, preferably from about 1 to 40 atmospheres. Typical Fischer-Tropsch activities of DAM catalysts activated in accordance with the process of the present invention are at least 120%, more frequently at least 150%, of that of the original DAM. By the same token, methane selectivity of the DAMs are reduced by the present process to below 80%, more frequently below 60% of the original DAM. As those of ordinary skill in the art are aware, the most desirable products of the Fischer-Tropsch synthesis described herein are higher molecular weight hydrocarbons. By contrast, therefore, it is desirable for there to be produced as little methane as possible. Hence, methane selectivity is enhanced when the percentage is reduced, therefore, a reduction in methane selectivity is a significant improvement.

The process of the present invention is obviously commercially attractive since it significantly enhances both the activity and the methane selectivity of the active metal catalyst. It is also within the purview of the present invention to carry out the two steps of the activation at different times since the pyrophoricity of the catalyst has been significantly reduced after the slurry low temperature oxidation to form the oxidized catalyst precursor in accordance with the present invention. The oxidized catalyst precursor may be shipped in conventional airtight containers under an inert atmosphere, such as nitrogen. Preferably, the catalyst oxidized in the slurry is further stabilized by treatment in air at a temperature above 100° C. for at least one hour, which may eliminate the requirement for shipping under an inert atmosphere. In either instance, there is a saving of the substantial cost presently incurred in shipping conventional active metal catalysts under water or occlusive coatings. The oxidative treatment of the present invention is also useful in enhancing the activity of DAM catalyst that has been withdrawn from an operating Fischer-Tropsch reactor. The present process may likewise be used to further enhance DAM catalyst that has been withdrawn from an operating Fischer-Tropsch reactor and renewed through the formation of a melt.

The catalysts formed from DAMs in accordance with the activation process of the invention are used in synthesis processes for the formation of higher hydrocarbons wherein liquid and gaseous products are formed by contacting a syngas comprising a mixture of hydrogen and carbon monoxide with shifting or non-shifting conditions, preferably the latter in which little or no water gas shift takes place. The process is carried out at temperatures of from about 160° C. to 260° C., pressures of from about 5 atm to about 100 atm, preferably from 10 to 40 atm, and gas space velocities of from about 300 V/Hr/V to about 20,000 V/Hr/V, preferably from about 1,000 V/Hr/V to about 15,000 V/Hr/V. The stoichiometric ratio of hydrogen to carbon monoxide is about 2.1:1 for the production of higher hydrocarbons. This ratio can vary from about 1:1 to 4:1, preferably from 1.5:1 to 2.5:1, more preferably from 1.8:1 to 2.2:1. These reaction conditions are well known to those skilled in the art and a particular set of reaction conditions can readily be determined from the parameters given herein. The reaction may be carried out in virtually any type of reactor, e.g. fixed bed, moving bed, fluidized bed and the like. The hydrocarbon-containing products formed in the process are essentially sulfur and nitrogen free.

The hydrocarbons produced in a process as described above are typically upgraded to more valuable products by subjecting all or a portion of the C5+hydrocarbons to fractionation and/or conversion. By "conversion" is meant one or more operations in which the molecular structure of at least a portion of the hydrocarbon is changed and includes both non-catalytic processing, e.g. steam cracking, and catalytic processing, e.g. catalytic cracking, in which the portion, or fraction, is contacted with a suitable catalyst. If hydrogen is present as a reactant, such process steps are typically referred to as hydroconversion and variously as hydroisomerization, hydrocracking, hydrodewaxing, hydrorefining and the like. More rigorous hydrorefining is typically referred to as hydrotreating. These reactions are conducted under conditions well documented in the literature for the hydroconversion of hydrocarbon feeds, including hydrocarbon feeds rich in paraffins. Illustrative, but non-limiting, examples of more valuable products from such feeds by these processes include synthetic crude oil, liquid fuel, emulsions, purified olefins, solvents, monomers or polymers, lubricant oils, medicinal oils, waxy hydrocarbons, various nitrogen- or oxygen-containing products and the like. Examples of liquid fuels includes gasoline, diesel fuel and jet fuel, while lubricating oil includes automotive oil, jet oil, turbine oil and the like. Industrial oils include well drilling fluids, agricultural oils, heat transfer oils and the like.

It is understood that various other embodiments and modifications in the practice of the invention will be apparent to, and can be readily made by, those of ordinary skill in the art without departing form the scope and spirit of the invention as described above. Accordingly, it is not intended that the scope of the claims appended hereto be limited to the exact description set forth above, but rather that the claims be construed as encompassing all of the features of patentable novelty that reside in the present invention, including all the features and embodiments that would be treated as equivalents thereof by those skilled in the art to which the invention pertains. The invention is further described with reference to the following experimental work.

EXAMPLE 1
Slurry Oxidation Using Air

Nine grams of commercial catalyst (Raney® 2700) was mixed with 270 cc of deionized water in a 500 ml three-neck round bottom flask. The flask was placed in a heating mantle and heated to 90° C. Air was vigorously bubbled into the flask to stir the slurry into suspension. The temperature was maintained at 90° C. during this time and water was added to compensate for loss during evaporation. After seven hours, the flask was placed under flowing nitrogen inside a glove box. The slurry was then filtered and dried under nitrogen. X-ray diffraction analysis showed characteristic diffraction peaks for cobalt metal (at about 44 degrees 2Π) and cobalt hydroxide (at about 19, 32.5 and 38 degrees 2Π). Traces of CoO may be present, but $Co_3O_4$ was not detected at all. In addition, 25.381 mg. of wet sample, taken before filtration, was analyzed by thermogravimetry treated by the subject process. The sample was dried under flowing argon to 100° C. to establish the weight of the dried sample (Ws). The argon flow was then replaced with an air flow and the temperature raised to 700° C. The weight of sample corresponded to the weight of a fully oxidized sample (Wo), i.e. $Co_3O_4$ that has an O/Co ratio of 1.33:1. The sample was then cooled to room temperature and purged under an argon flow for 30 minutes. The argon flow was replaced with a hydrogen flow and the temperature raised again to 700° C. at the rate of 10° C. per minute. The weight of sample corresponded then to the weight of a fully reduced sample (Wr), i.e. cobalt metal, which has an O/Co ratio of zero. The oxygen content of the sample treated by the present process was calculated by using the following equation:

$$O/Co = 1.33 \times (Ws - Wr) \div (Wo - Wr)$$

The sample treated in accordance with the present invention had a O/Co ratio of 0.47, indicating that the sample was approximately composed of 23% cobalt hydroxide and 77% cobalt metal.

EXAMPLE 2
Slurry Oxidation Using Nitric Acid

Sixteen grams of commercial catalyst (Raney® 2700) was placed in a beaker with a small amount of water and stirred with a Teflon®-coated stirring blade. A total of 17.6 cc of 0.5N nitric acid solution was added drop-wise. The temperature of the slurry began to rise and reached 42° C. upon completion of the addition. The slurry was stirred for an additional 30 minutes. During the oxidation of the catalyst, the pH of the slurry became basic due to the reduction of the nitrate ions to ammonium ions. The total amount of nitrate ions added was adjusted in order to achieve a complete consumption of the hydrogen dissolved in the catalyst and the native hydrogen generated by the acidic oxidation of the metal. Further addition of nitric acid would result in a dissolution of cobalt ions into the solution, evidenced by a pink coloration, which is undesirable. The deactivated catalyst was filtered, washed with deionized water and dried under an inert atmosphere according to the procedure utilized in Example 1. X-ray and thermogravimetric analyses were conducted according the procedures described in Example 1. The sample was essentially composed of cobalt metal, cobalt hydroxide and a trace of CoO. No $Co_3O_4$ was detected by the X-ray analysis. The O/Co ratio measured by thermogrametry was 0.6, indicating that the sample contained approximately 30% cobalt hydroxide and 70% cobalt metal.

EXAMPLE 3
Slurry Oxidation Using Hydrogen Peroxide

A total of 6.4 grams of commercial catalyst (Raney® 2700) was placed in a beaker with a small amount of water and stirred with a Teflon®-coated stirring blade. A total of 60 cc of 2% hydrogen peroxide solution was added drop-wise. The temperature of the slurry began to rise and reached 40° C. upon completion of the addition. The slurry was stirred for an additional 30 minutes. The deactivated catalyst was filtered, washed four times with deionized water and dried under an inert atmosphere according to the procedure utilized in Example 1. X-ray and thermogravimetric analysis were conducted according the procedures described in Example 1. The sample was essentially composed of cobalt metal and cobalt hydroxide. No CoO or $Co_3O_4$ was detected by the X-ray analysis. The O/Co ratio measured by thermogravimetry was 0.81, indicating that the sample contained approximately 40% cobalt hydroxide and 60% cobalt metal.

EXAMPLE 4

A suspension of commercial catalyst (Raney® 2700) consisting of about 30 grams cobalt with water having a cobalt to water ratio of at least 5:1 was in a 500 ml three-neck round bottom flask. Air was vigorously bubbled into the flask to stir the slurry into suspension. The temperature of the slurry was raised to 60° C. during which a slow oxidation of the catalyst occurred. After six hours, the airflow was stopped and a small sample of the catalyst removed and dried to verify the loss of pyrophoricity. If the oxidation had not been sufficient, a strong exotherm would have been observed, accompanied by a spotty orange glow upon filtering in air, indication that further oxidation was required. Upon completion of the oxidation, the oxidized cobalt was filtered. In contrast with Example 1, a slight increase in temperature was observed during filtration in air, indicating that further oxidation was occurring during the filtration in air. Most noticeable was the fact that the exotherm generated by contacting with air is controllable as opposed to the exotherm observed when fresh Raney catalyst is contacted with air. The deactivated catalyst was dried in a vacuum oven at 80° C. for two hours and analyzed as in Example 1. The analysis showed that the oxidized catalyst precursor was composed of cobalt metal, CoO, cobalt hydroxide and $Co_3O_4$. The O/Co ratio was 0.9, indicating that the precursor was oxidized to a greater degree that the sample filtered in nitrogen formed in Example 1. Furthermore, the presence of $Co_3O_4$ is a clear indication that the oxidation of the cobalt under slurry conditions is different from the direct oxidation with air, which is responsible for the formation of $Co_3O_4$. The oxidized catalyst precursor was reduced in a fixed-bed reactor under flowing hydrogen, atmospheric pressure, 375° C. for 2 hours. GHSV>20,000. In the event that the resulting reduced catalyst was not to be utilized directly in a Fischer-Tropsch synthesis, it could be stored in an air-free, inert environment.

EXAMPLE 5

A Fischer-Tropsch synthesis was carried out in an autoclave equipped with a stirrer and a flow-through gas supply. The pressure was maintained at 280 psig by means of a backpressure regulator. Carbon monoxide conversions were measured by means of a chromatographic analysis and by gas contraction. Approximately 11.3 g of commercially available Raney cobalt catalyst was charged to the autoclave as an aqueous slurry, assuming a 1.62 g/ml density on top of 375 g of wax. The autoclave was purged for 30 minutes with hydrogen. The temperature was then raised to the melting point of the wax, 210° F., and maintained for a time sufficient to eliminate the water from the autoclave. There was thus-formed a slurry of Raney cobalt in molten wax. The feed gas was then changed from hydrogen to a 2.4:1 mixture of hydrogen and carbon monoxide and the temperature gradually raised to reaction temperature, i.e. about 380° F. In a second run under the same conditions, the catalyst had been treated in accordance with the invention as shown in Example 4. Typical reaction conditions for both runs were 430° F., GHSV 3,400 to 4,000 per hour, total pressure 280 psig. The results for the two runs are shown in Table 1.

TABLE 1

| Catalyst | GHSV(hr-1) | CO conv. % | CH4% | Activity |
|---|---|---|---|---|
| Not Treated | 3,400 | 26.6 | 14.1 | 3.0 |
| Treated | 4,000 | 46.0 | 5.3 | 6.0 |

The data in Table 1 clearly shows the beneficial effect of the process of the subject process, i.e. a 2-fold increase in catalytic activity and a three-fold enhancement (decrease) in methane selectivity.

EXAMPLE 6

A slurry of about 30 g of commercial Raney catalyst in water having a water to cobalt ratio of 5:1 was placed in a round bottom flask and stirred into suspension with a glass stirrer. There was then added to the flask 20 ml of 0.5N nitric acid by dropwise addition. During the addition, the temperature of the slurry slowly rose to about 40–50° C. and the pH increased to about 11. During the oxidation of the catalyst, the nitrate ions in the slurry were reduced to ammonium ions, thus producing an increase in pH. The total amount of nitrate ions added was adjusted so as to achieve a complete consumption of both the hydrogen dissolved in the Raney catalyst and that generated by the oxidation of the metal in the catalyst. After stirring for 5 minutes, the solids were filtered, washed four times with deionized water and dried in a vacuum oven at 80° C. for two hours. Thermogravimetric analysis of the catalyst was consistent with 0.9 oxygen per Co as in the treated catalyst in Example 4. The oxidized catalyst was stored as is. X-Ray diffraction analysis showed that the oxidized catalyst precursor for the treated catalyst was composed of cobalt metal, CoO, Co(OH)$_2$ and Co$_3$O$_4$.

A comparative run was conducted utilizing the treated catalyst from Example 1 and the nitric acid oxidized catalyst prepared as described above, both of which had been reduced with hydrogen gas at 375° C. for two hours. Typical reaction conditions for both catalysts were 430° F., GHSV 8,700 per hour, total pressure 280 psig. The results for the two runs are shown in Table 2.

TABLE 2

| Catalyst | Hydrogen/CO | CO conv. % | CH4% | Activity |
|---|---|---|---|---|
| Example 1 | 2.1:1 | 83 | 9.5 | 11.8 |
| Example 6 | 2.1:1 | 79 | 8.6 | 11.7 |

The activity for the treated catalysts is statistically identical, the only difference being a slightly lower methane selectivity for the catalyst oxidized with nitric acid.

EXAMPLE 7

A slurry was formed of 7 ml of wet Raney® 2700 catalyst in deionized water. A total of 10 ml of hydrogen peroxide was added dropwise to the slurry, each drop producing a white cloud characteristic of a highly exothermic reaction. Upon complete addition of the peroxide, the temperature of the slurry had reached 60° C. After stirring for 30 minutes, the temperature had returned to ambient. The catalyst was filtered and washed twice with deionized water. A slight increase in temperature was observed upon filtering indicating that the oxidation was incomplete. The heat release was insignificant in comparison to the orange glow characteristically observed when contacting dry Raney catalyst with air at ambient temperature. Thermogravimetric analysis of the catalyst was consistent with 0.9 oxygen per Co. X-Ray diffraction analysis showed that the oxidized catalyst precursor for the treated catalyst was composed of cobalt metal, CoO, Co(OH)$_2$ and Co$_3$O$_4$.

What is claimed is:

1. A process for converting one or a mixture of particulate dispersed active metals characterized by the capacity to form more than one oxide to an oxidized catalyst precursor comprising:

a) forming a slurry of the dispersed active metals in a suitable fluid;

b) contacting the dispersed active metals in the slurry with an oxidizing agent at temperatures below 200° C. for a time such that the metals no longer exhibit uncontrollable pyrophoricity, thereby forming an oxidized catalyst precursor comprising said metals and at least one of hydroxides thereof and oxides thereof, wherein at least a portion of said hydroxides and oxides are of the lower oxidation state of the metals;

c) recovering said oxidized catalyst precursor; and d) drying said oxidized catalyst precursor.

2. A process in accordance with claim 1, wherein the dispersed active metals are contacted in the slurry with a gaseous oxidant.

3. A process in accordance with claim 2, wherein the gaseous oxidant contains a member selected from the group consisting of oxygen, ozone and nitrogen oxides.

4. A process in accordance with claim 1, wherein the fluid forming the slurry comprises water and the oxidized catalyst precursor includes hydroxides of the metals.

5. A process in accordance with claim 4, wherein the fluid is an emulsion.

6. A process in accordance with claim 1, wherein step b) is carried out at a temperature below 100° C.

7. A process in accordance with claim 1, wherein the fluid forming the slurry is a mixture of hydrocarbons or a supercritical fluid.

8. A process in accordance with claim 1, wherein the oxidant is contained within the slurry fluid.

9. A process in accordance with claim 8, wherein the oxidant is selected from the group consisting of nitric acid, an inorganic nitrate and a peroxide.

10. A process in accordance with claim 1, wherein said precursor is dried under an inert atmosphere.

11. A process in accordance with claim 1, wherein said precursor is dried in air at a temperature above 100° C. for at least one hour.

* * * * *